United States Patent [19]

Akiyama et al.

[11] Patent Number: 5,113,247
[45] Date of Patent: May 12, 1992

[54] SOLID STATE IMAGE PICKUP APPARATUS FOR CORRECTING DISCREPANCY OF REGISTRATION

[75] Inventors: Toshiyuki Akiyama, Tokorozawa; Itaru Mimura, Sayama; Naoki Ozawa, Akishima; Kenji Takahashi, Tsukui; Yoshizumi Eto, Sagamihara; Takahiro Matsumoto, Hachioji, all of Japan

[73] Assignee: Hitachi, Ltd., Tokyo, Japan

[21] Appl. No.: 378,399

[22] Filed: Jul. 11, 1989

[30] Foreign Application Priority Data

Jul. 13, 1988 [JP] Japan ................................ 63-172709
Sep. 16, 1988 [JP] Japan ................................ 63-229964
Oct. 14, 1988 [JP] Japan ................................ 63-257130

[51] Int. Cl.$^5$ ..................... H04N 9/093; H04N 7/18; H04N 3/223
[52] U.S. Cl. ........................ 358/51; 358/93; 358/180
[58] Field of Search ................ 358/51, 93, 213.11, 358/213.13, 241, 55, 209, 180, 50

[56] References Cited

U.S. PATENT DOCUMENTS

| 4,415,924 | 11/1983 | Kawabata et al. ............... 358/50 |
| 4,472,740 | 9/1984 | Doi .................................. 358/51 |
| 4,644,405 | 2/1987 | Roy et al. ....................... 358/180 |
| 4,733,296 | 3/1988 | Honbo et al. .................... 358/51 |

OTHER PUBLICATIONS

Y. Kawamura, et al., "4-2 High-Definition Television Camera", from TV Association, vol. 1, 36, No. 10, 1982, pp. 40-47, provided in Japanese, English translation unavailable.
"Digital Signal Processing of Images", published by Nikkan Kogyo Shinbun, pp. 113, provided in Japanese, English translation unavailable.

Primary Examiner—John K. Peng
Attorney, Agent, or Firm—Fay, Sharpe, Beall, Fagan, Minnich & McKee

[57] ABSTRACT

An image pickup apparatus comprising: a two-dimensional filter for interpolating the registration discrepancy due to the chromatic aberrations of the lens used; and a two-dimensional filter for correcting the fixing discrepancy of an image pickup element. The registration discrepancy may be corrected by guiding video signals from the image pickup element through the two-dimensional filters.

17 Claims, 13 Drawing Sheets

SOLID STATE IMAGE PICKUP APPARATUS FOR CORRECTING DISCREPANCY OF REGISTRATION

BACKGROUND OF THE INVENTION

The present invention relates to a color solid state image pickup camera and, more particularly, to a solid state image pickup apparatus capable of correcting the discrepancy of registration, hereinafter termed "registration discrepancy", due to the fixed point discrepancy of a solid state image pickup element of the chromatic aberration of a camera lens. At present, broadcasting stations widely use triple-tube TV cameras. Because of the development of solid state image pickup elements, however, the image pickup tubes are being replaced by multi-disc TV cameras using solid state image pickup elements.

FIG. 7 is a block diagram showing the triple-tube camera as one example of the prior art. An incident ray is separated by a lens 1 and a prism 2 into image signals of primary colors (i.e., red R, green G, and blue B colors), which are individually transformed into electric signals by camera tubes 3. These electric (or image) signals are processed through a video signal processor 4 to generate video signals.

If the centers of the images of the colors separated by the prism of FIG. 7 are not properly aligned with respect to the light receiving faces of the image pickup tubes or if the lens has chromatic aberrations of the like, the positions of the images contained in the video signals are offset. Images which are offset cause individual colors to form a twin image (due to the registration discrepancy), run colors together or decrease the resolution. As a result, quality is deteriorated. This problem also arises in the multi-disc camera. This makes it necessary for both the multi-tube and the multi-disc type cameras to register the images of the individual tubes or elements accurately.

In the case of the image pickup tube, the positioning of the photodetect areas can be corrected to some extent by adjusting the deflection signals of an electron beam. In the multi-tube camera of the prior art, characteristics of the image tube are utilized to register the photodetect areas of the three tubes by adjusting the current flow of a deflection signal generator 6 shown in FIG. 7.

Specifically, conditions such as the positions and aperture angles (which correspond to the zooming ratio, the F-number, and the distance to an object) are detected at first by a lens condition detector 7' which is composed of a potentiometer of a rotary encoder mounted in the lens. On the other hand, the aberration of the lens is changed with the position on a picture, the colors of the ray or the lens conditions such as the zooming ratio, the F-number, or the distance to an object. Therefore, this data is stored in advance in a memory/calculator of the registration discrepancy 7. On the basis of this stored data, the registration discrepancies at the individual picture positions are calculated from the lens conditions obtained from the lens condition detector 7'. On the basis of these registration discrepancies, the deflection signal generator 6 corrects the problem modifying the current of the deflection signal (as disclosed on pp. 40 to 47 of TV Association, Vol. 1.36, No. 10 (1982).

Thus, in a camera using the image pickup tube, the position of the photodetect area can be corrected to some extent by adjusting the deflection signal of the electron beam to allow for the fixed point of the image pickup tube. Moreover, the registration discrepancy of the chromatic aberration of the lens can also be adjusted to some extent.

In the solid state image pickup element, however, the image position is fixed on the photodetect plane so that the positional distortion cannot be freely corrected. As a result, the multi-disc camera is required to have a high degree of accuracy in the fixed pint registration of each image pickup element and in the fixing method or the characteristics of the lens used.

On the other hand, the present TB system is being examined to make the existing NTSC system finer. The picture element pitch of the solid state image pickup element used in this system is far smaller than that of the prior art and requires a high degree of accuracy in the fixed point of the element and in the lens. This high degree of accuracy makes adjustment difficult, raises the production cost, and requires an expensive lens.

SUMMARY OF THE INVENTION

The present invention provides a solid state image pickup apparatus which is able to form an image of excellent quality by registration discrepancy correcting means even if the fixing accuracy of the solid state image pickup element and the lens performance are not high.

In order to accomplish the above-specified object, according to the present invention, the registration discrepancy of the image due to the fixed point discrepancy of the image pickup element is corrected in the following manner. Even if the fixing point of the solid state image pickup element is not properly aligned with the optic axis of the optical lens, the photodetect area of the solid state image pickup element to be used is widened to produce image signals of necessary picture elements from the vicinity of the optic axis, and the number of picture elements is accordingly increased in advance. After the solid state image pickup element is fixed in the optical system, moreover, the positional relations between the photodetect area of the solid state image pickup element and the optical lens is measured in advance, and their data is stored in the camera. Moreover, a two-dimensional filter is provided for anticipating the image level of each picture element area obtained from each picture element of the solid image pickup element may be guided through the two-dimensional filter to output interpolated signals. Here, the coefficient of the two-dimensional filter to be used is determined and used for each picture element or for a predetermined block on the basis of the stored fixed point discrepancy.

The registration discrepancy due to the chromatic aberration of the lens is corrected in the following manner. In addition to the aforementioned two-dimensional filter for correcting the fixed point discrepancy of the image pickup element, a two-dimensional filter for interpolating the registration discrepancy due to the chromatic aberration is provided. The video signal obtained from each picture element of the solid state image pickup element is guided through the two two-dimensional filters so that it may be output with an interpolated registration discrepancy. Alternatively, the coefficient of the two-dimensional filter for correcting the fixed point discrepancy of the image pickup element is interpolated one time and output through one two-dimensional filter which has been corrected. Correction of the two-dimensional filter takes into account the registration discrepancy due to the chromatic aberration.

Here, the coefficient of the additional two-dimensional filter is determined for each picture element or a predetermined block on the basis of the discrepancy of each picture element, which is determined by the position and color of the picture and the conditions (e.g., the zooming ratio, the F-number, and the distance to the object) of the lens. Moreover, the correction of the coefficient of the two-dimensional filter for the one-time interpolation is carried out by using the coefficient determined from the aforementioned lens conditions.

According to the present invention, the image signals of the necessary area can always be obtained from the solid state image pickup element even with the discrepancy in the fixed point of the solid state image pickup element.

Even if the output signals of the solid state image pickup element have registration discrepancy due to the fixed point discrepancy of the image pickup element or the chromatic aberration of the lens, the image signals having no registration discrepancy. The data necessary for the image output is obtained by interpolating the output signals of the solid state image pickup elements. Thus, a high degree of accuracy is not required for the fixing accuracy of the image pickup element. Further, the lens used need not be of high quality.

DESCRIPTION OF THE PREFERRED EMBODIMENT

Figure 1:
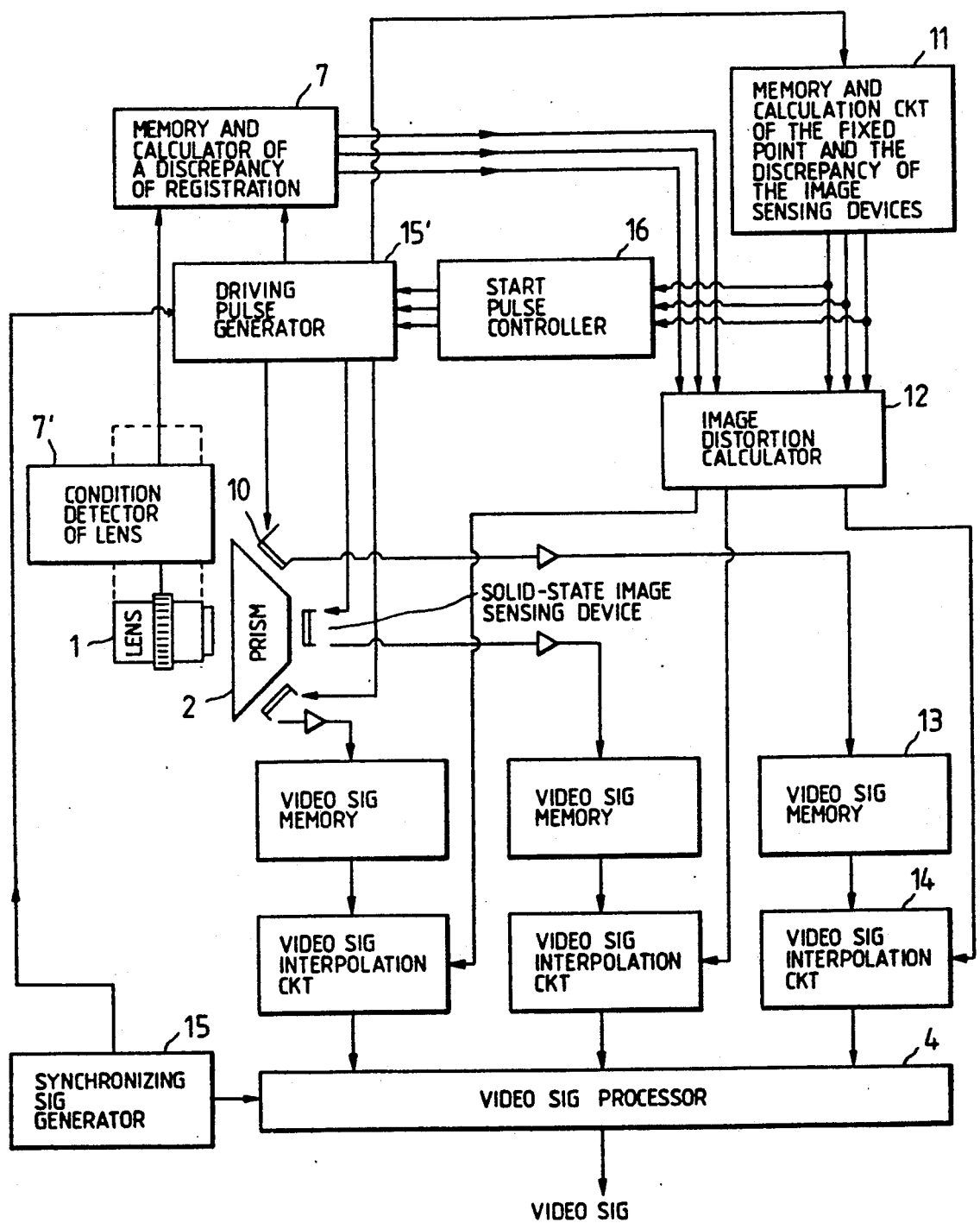
FIGS. 1 to 6 are diagrams showing and explaining a first embodiment of the present invention.
Figure 7:
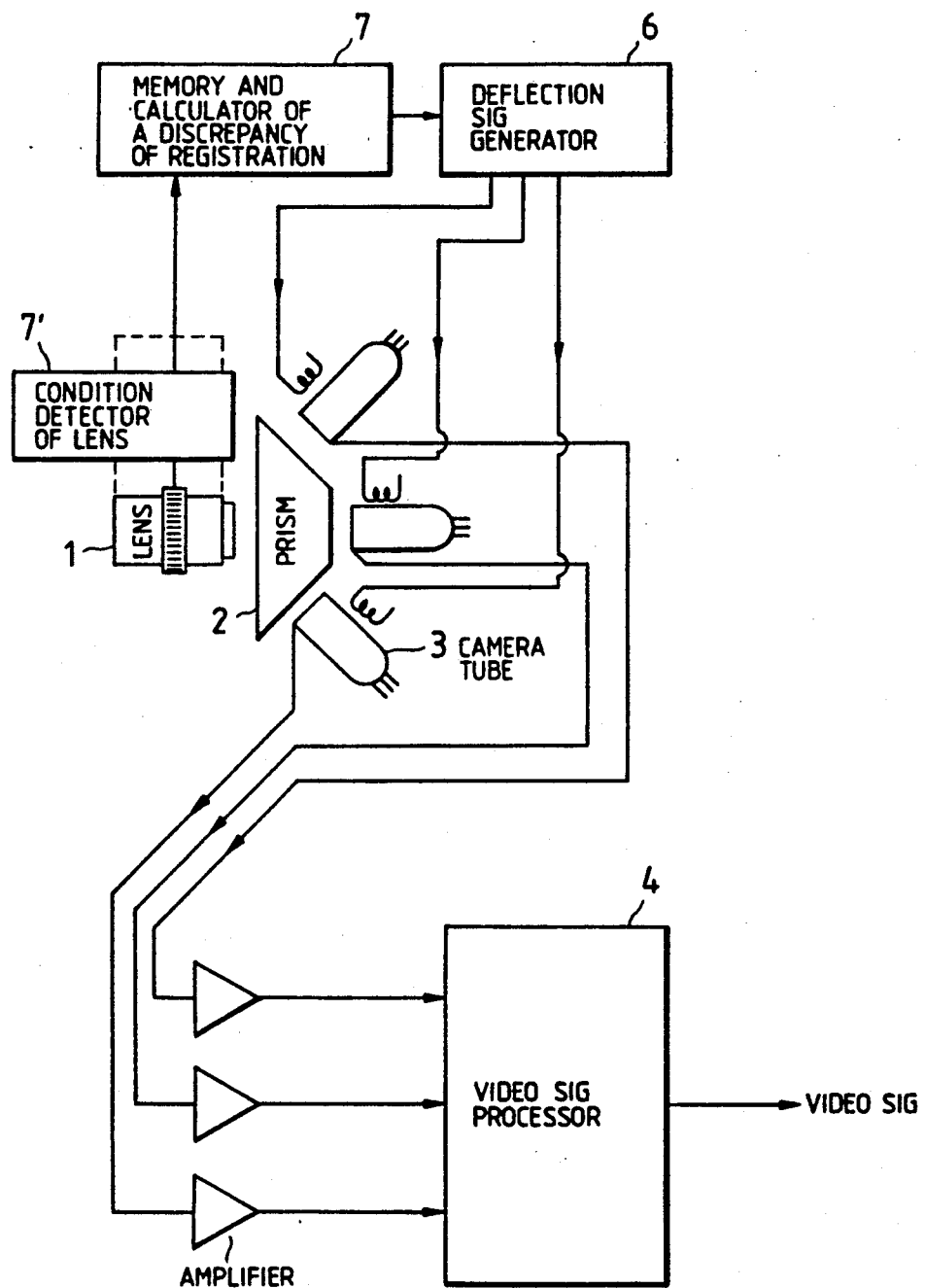
FIG. 7 is a block diagram showing the circuit of the prior art.

The first embodiment of the present invention is shown in FIG. 1. In tee circuit of the prior art, as shown in FIG. 7, the deflection signal is adjusted to move the position of the photodetect area directly on the image pickup tube. The circuit of FIG. 1, though, is different from the circuit of the prior art in that 1.) the data of the fixed point discrepancy of the image pickup element or the chromatic aberration of the lens is stored in advance; 2.) the registration discrepancy is calculated on the basis of the stored data; and, 3.) the image signal obtained from each picture element of the solid state image pickup element is guided through a two-dimensional filter determined by the registration discrepancy so that the image signals necessary for the picture output may be anticipated and interpolated.

Figure 2:
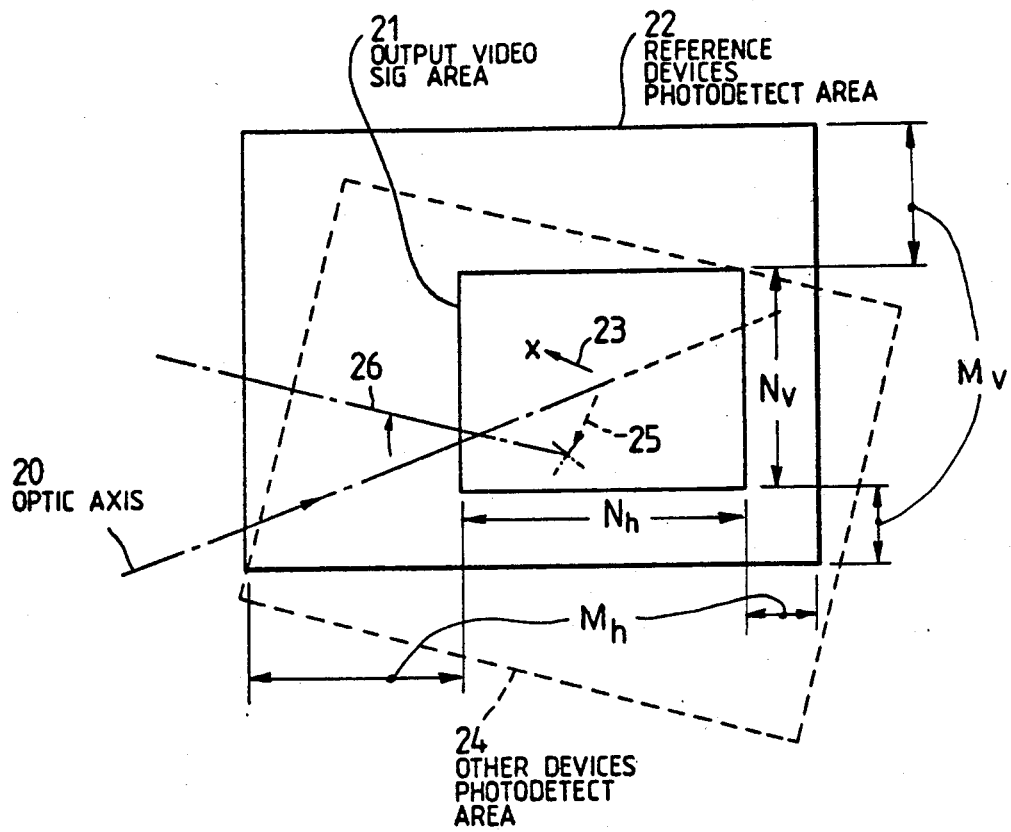

In FIG. 1, the images separated by a prism 2 are transformed into electric signals by respective solid state image pickup elements 10. The number of the picture elements of the solid state image pickup element used at this time is usually about two to five time more in the vertical and horizontal directions. Enough picture element are used in order to eliminate the influences of the peripheral portions of the effective picture elements. In the present invention, however, even if the fixed positions of the solid state image pickup element is not properly aligned with the optic axis 20 of the optical lens, as shown in FIG. 2, the photodetect areas 22 and 24 of the solid state image pickup element used are widened to produce all the image signals of effective picture elements 21 necessary for output from the vicinity of the optical axis. The total number of photodetect picture elements is accordingly increased. Specifically, the photodetect area of the solid state image pickup element is widened to have more than the following picture element numbers:

Vertical: Picture elements of (Nv+Mv); and
Horizontal: Picture elements of (Nh+Mh).

This holds true of the numbers of effective picture elements necessary for the output are designed at Nv in the vertical direction (i.e., the length Lv on the elements in the image pickup tube) and at Nh in the horizontal direction (i.e., the length Lh on the elements in the image pickup tube), and if the picture element converted values of the fixing discrepancy for all the picture elements having an equal pitch are designated at Mv in the vertical direction (i.e., the length Jv on the elements in the image pickup tube) and at Mh in the horizontal direction (i.e., the length JH on the elements in the image pickup tube).

A memory/calculator of the fixed point and the discrepancy of the image pickup elements 11 is a circuit for storing and calculating the data relating to the fixed point and the discrepancy of the image pickup elements. Specifically, the memory/calculator 11 measures and stores the data in advance. The data stored is that which is necessary for calculating the discrepancy of each picture element due to the fixing discrepancy after the solid state image pickup elements have been fixed in the optical system. Examples include the positions 23 and 25 and the angle of rotation 26 in the photodetect area, in which the photodetect area of the solid state image pickup elements and the optic axis of the optical lens intersect. On the basis of this data, the memory/calculator 11 calculates the discrepancy of each picture element and outputs it to an image distortion calculator 12. Incidentally, the discrepancies may be calculated and stored in advance in the table so that they may be sequentially read out and output.

Figure 3:
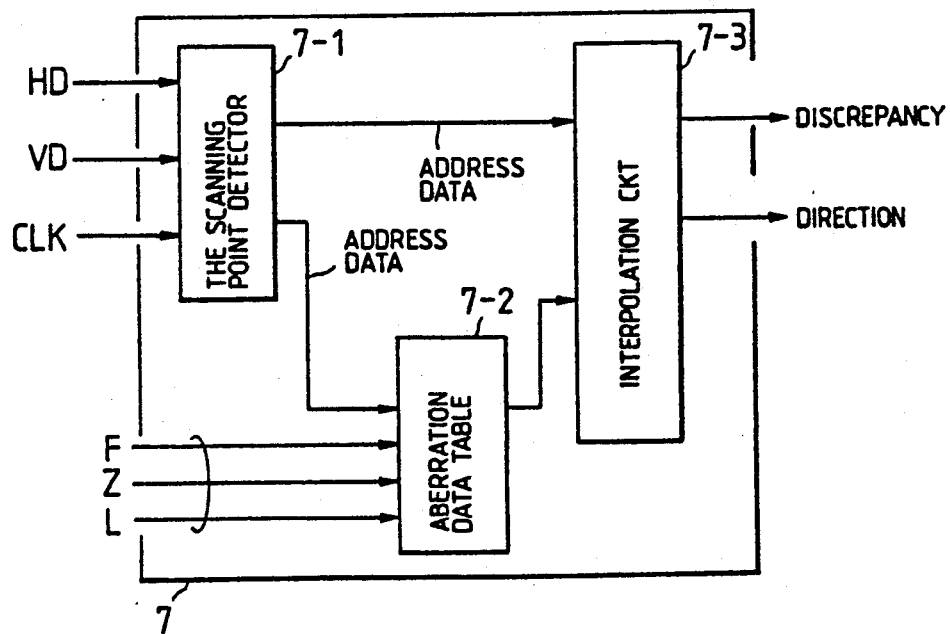

On the other hand, a memory/calculator 7 of registration discrepancy is a circuit for storing and calculating the data related to the chromatic aberration of the lens. An example of the more detailed structure of this circuit is shown in FIG. 3. An aberration data table 7-2 is a circuit for storing the characteristics of the lens such as the coefficients of the functions of approximating curves (e.g., the coefficients of three-dimensional functions) expressing the picture dependencies of image discrepancies (e.g., the discrepancy of the R and B signals from the G signal). Since, however, these discrepancies vary according to the colors of the incident ray or the lens condition (e.g., the zooming ratio Z, the F-number F or the distance L to the object), it is necessary to prepare the data table corresponding to the respective conditions. Moreover, it is desirable to change the coefficients of the approximating function as smoothly as possible by linear approximations so that the image will not be distorted when the conditions are changed. After these preparations, the following calculations are completed. Specifically, a scanning point detector 7-1 calculates the picture positions of the output signals on the basis of the synchronizing signals (e.g., a horizontal synchronizing signal HD, a vertical synchronizing signal VD, and a clock CLK) obtained from a synchronizing signal generator 15 and a driving pulse generator 15'. In an interpolator 7-3, moreover, the discrepancy of each picture element is calculated and output to the image distortion calculator 12 from the picture position determined by the scanning point detector 7-1, the condition (i.e., the zooming ratio, the F-number, and the distance to the object) obtained from a lens condition detector 7', and the lens condition stored. Incidentally, these discrepancies may be calculated and stored in advance in the table so that they may be sequentially read out and output.

The image distortion calculator 12 of FIG. 1 is a circuit for totalling the registration discrepancies caused by the lens conditions and the fixing discrepancies, to determine the final image distortion. Incidentally, the input signals from the memory/calculator 11 and the memory/calculator 7 is the data necessary for calculating the individual discrepancies such as the angle of rotation of the elements or the coefficients of the approximating functions. Thus, the final image distortion may be calculated at one time in the image distortion calculator 12.

Figure 4A:
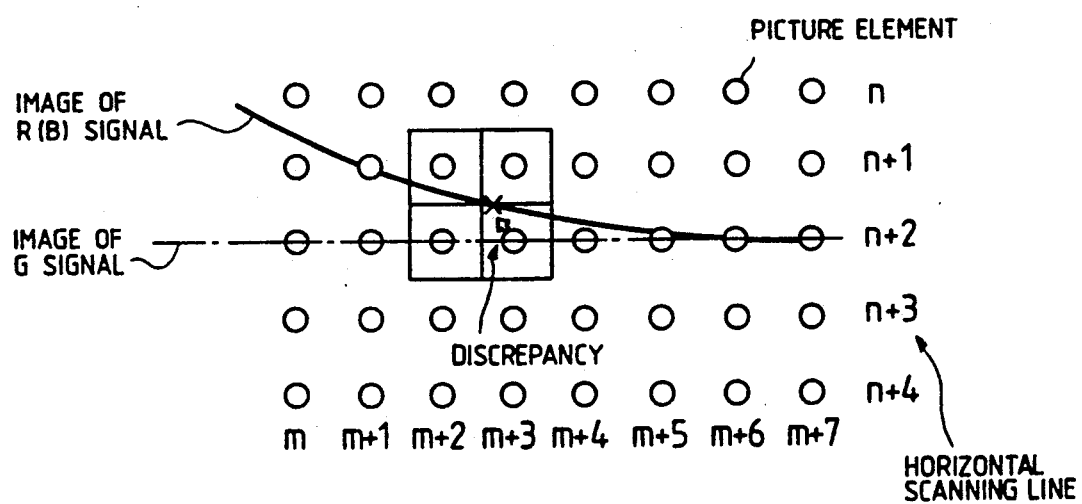

Next, an example of the interpolation method used for calculating the levels of the image signals necessary for the output from the output signals of the solid state image pickup element 10 will be described. FIG. 4A is a schematic diagram showing the relations between the picture elements (or sampling points) of the solid state image pickup elements and the image positions. In FIG. 4A, circles indicate the positions of the picture elements. Moreover, letters n, n+1, n+2, ..., and so on designate the line numbers of the individual scanning lines whereas the letters m, m+1, m+2, ..., and so on designate the picture element numbers in the horizontal direction. For simplicity, the case in which a white line in the horizontal direction is photographed is shown. In FIG. 4A, a solid line indicates the line of the R image obtained at this time, and a single-dotted line indicates the line of the G image. The image of the same point to be formed in the picture element point (n+2, m+3) in the G image is focused with a discrepancy at a point X in the R image. As a result, the image of the R image at the same point as that of the signal of the G image obtained from the picture element point (n+2, m+3) cannot be directly obtained form the solid state image pickup elements. Therefore, the R signal of level R' of the point X is determined from the following two-dimensional filter equation:

$$R' = \sum_{i,j=1}^{2} 1_{i,j} \times R_{i,j}.$$

Here, letters $R_{i,j}$ designate the output level of the R signal obtained from the four points (as indicated in an enlarged scale in FIG. 4B) adjacent to the point X, as indicated by a square frame. On the other hand, the value of the coefficient $a_{j,i}$ is deduced from the following equations using the letters appearing in FIG. 4B:

$$a_{j,i} = q \times s, \quad a_{1,2} = q \times r; \text{ and}$$

$$a_{2,1} = p \times s, \quad a_{2,2} = p \times r,$$

wherein: $p+q=1$; and $r+s=1$.

Figure 4B:
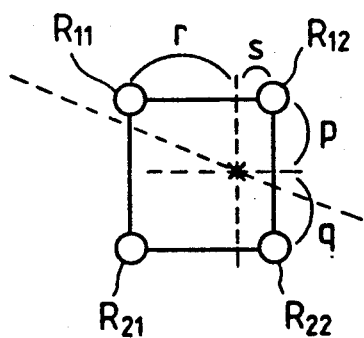

As is apparent from FIG. 4B, the coefficient values have to be changed for the magnitude of the registration discrepancy of the R image.

In the circuit of FIG. 1, these interpolations are accomplished in the following manner. Of the electric signals transformed by the solid state image pickup elements 10, at least a portion of the signals of a picture in the vicinity of the discrepancy of the image are sequentially stored in video signal memories 13 in accordance with the picture element position of the output (although the signals read out from the image pickup elements are amplified to a predetermined level). The coefficients of the two-dimensional filter are determined according to the above-specified equations by the coefficient calculating portions of video signal interpolators 14. At the same time, the interpolation signal levels are calculated by the interpolation portions of the video signal interpolators 14 from the picture elements stored in the video signal memories 13 and the coefficients deduced. The interpolation signals determined by the video signal interpolators 14 are fed through a video signal processor 4 to produce video signals.

Figure 5A:
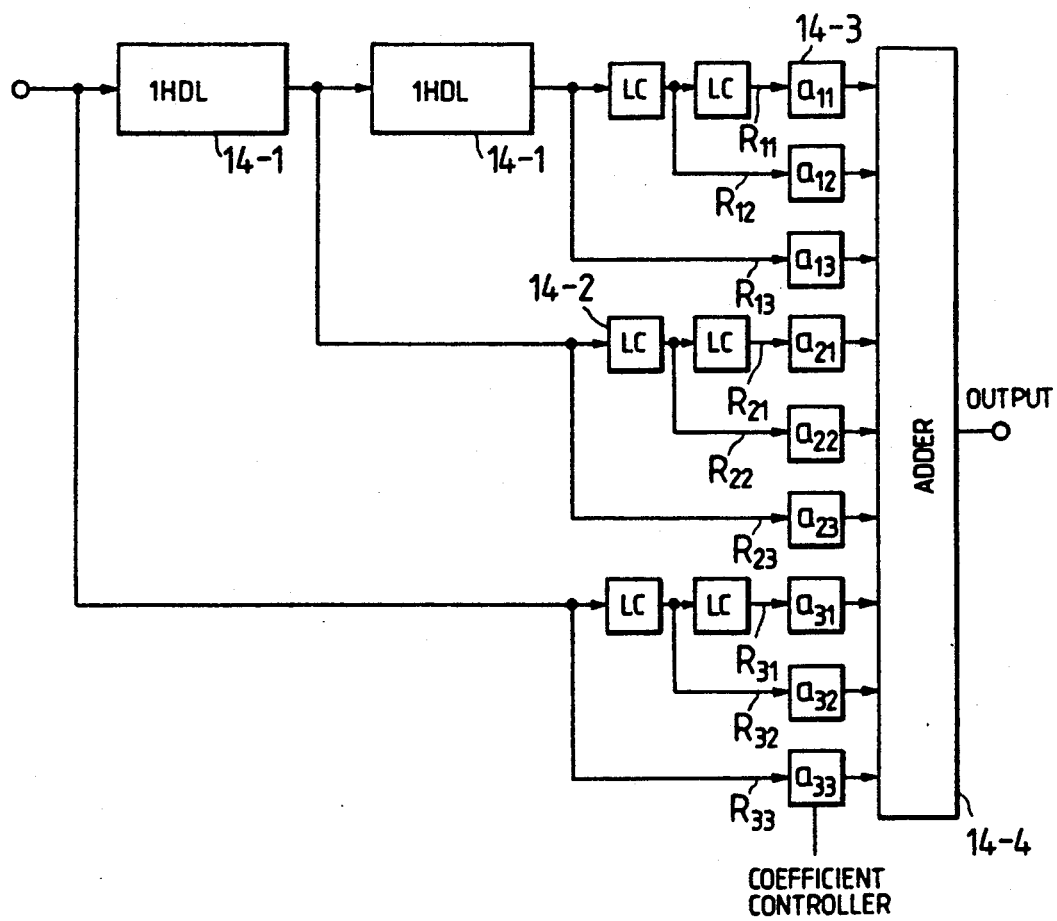
Figure 5B:
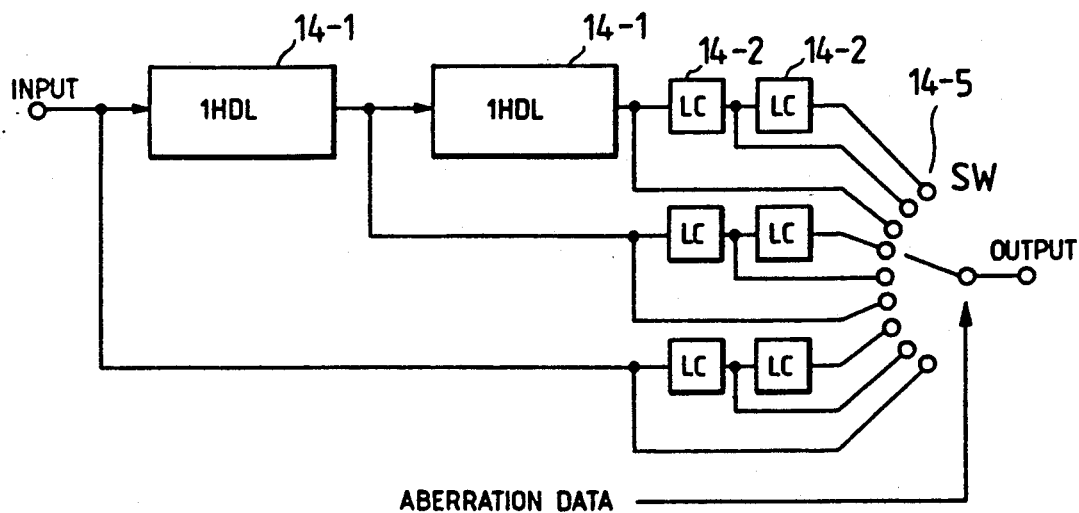

The interpolations are calculated by linearly approximating two adjoining points. The interpolations can be accomplished by approximating the two points by an arbitrary curve. A better approximation can be obtained by approximating the signals of the picture element points over a wider range of 3×3, 5×5 or the like, or by substituting the signals of the adjoining picture elements. FIG. 5 shows a device for accomplishing those interpolations. FIG. 5A shows an example of a circuit the interpolates across the range of 3×3. Reference numerals 14-1 or "1HDL" designate a shift register for delaying the horizontal scanning interval or a circuit for timing the vertical direction. Numerals 14-2 or "LC" designates a latch circuit for operating the horizontal driving clock of the solid state image pickup elements or a circuit for timing the horizontal direction. Numerals 14-3 designate a multiplier or a circuit for multiplying the adjacent signals $R_{i,j}$ by the coefficient $a_{i,j}$ of the two-dimensional filter. Numerals 14-4 designate an adder or a circuit for summing the results of the above-specified multiplications. On the other hand, FIG. 5B shows an example of the circuit for substituting the signals of the adjacent picture elements. The multiplier 14-3 and the adder 14-4 of the circuit of FIG. 5A are replaced by a signal selector 14-5 for selecting the signal of the picture element closest to the focal point. Both of those circuit structures are given the function of the video signal memories 13.

Figure 6:
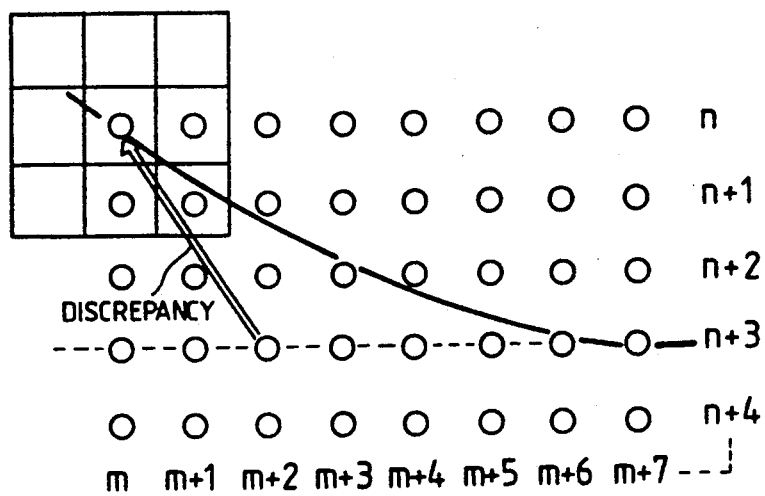

In case, on the other hand, the lens conditions or the fixing accuracy of the image pickup elements are so poor that the registration discrepancy exceeds the pitch of several scanning lines or several picture elements, a center picture element address is designated and restricted to the adjacent picture elements, as shown in FIG. 6.

Here, a start pulse controller 16 is inserted to suppress the storage capacity of the video signal memories 13 in connection with the parallel distortion components of the fixing discrepancy of the image pickup elements. In the controller 16, the picture element signal read start pulse timing is calculated for each image pickup element to control the driving pulse generator 15' so that the picture element signals in the vicinity of the optic axis may be output at substantially equal intervals. As a result, the picture element signals necessary for the interpolations are output from the image pickup elements, while being timed with the outputs of the interpolated picture element signals, to eliminate the necessary buffer memory for timing the output signals from the individual elements.

Incidentally, in the circuit of FIG. 1, in order to suppress the rounded discrepancy for calculating the image signals to anticipate and interpolate the signal levels of the picture element position of the output, the distortion of the image is determined so that the video signal may be calculated all at once. However, the corrections may be independently made.

The descriptions have been made assuming the use of digital processing, but similar results can be obtained by using analog processing.

Thus, in the present circuit, the distortion of the images on the solid state image pickup elements can be corrected by the video signal processors. As a result, the solid state image pickup elements do not require excessively high accuracies in either the fixed points of the image pickup elements or the characteristics of the lens used.

Figure 8:
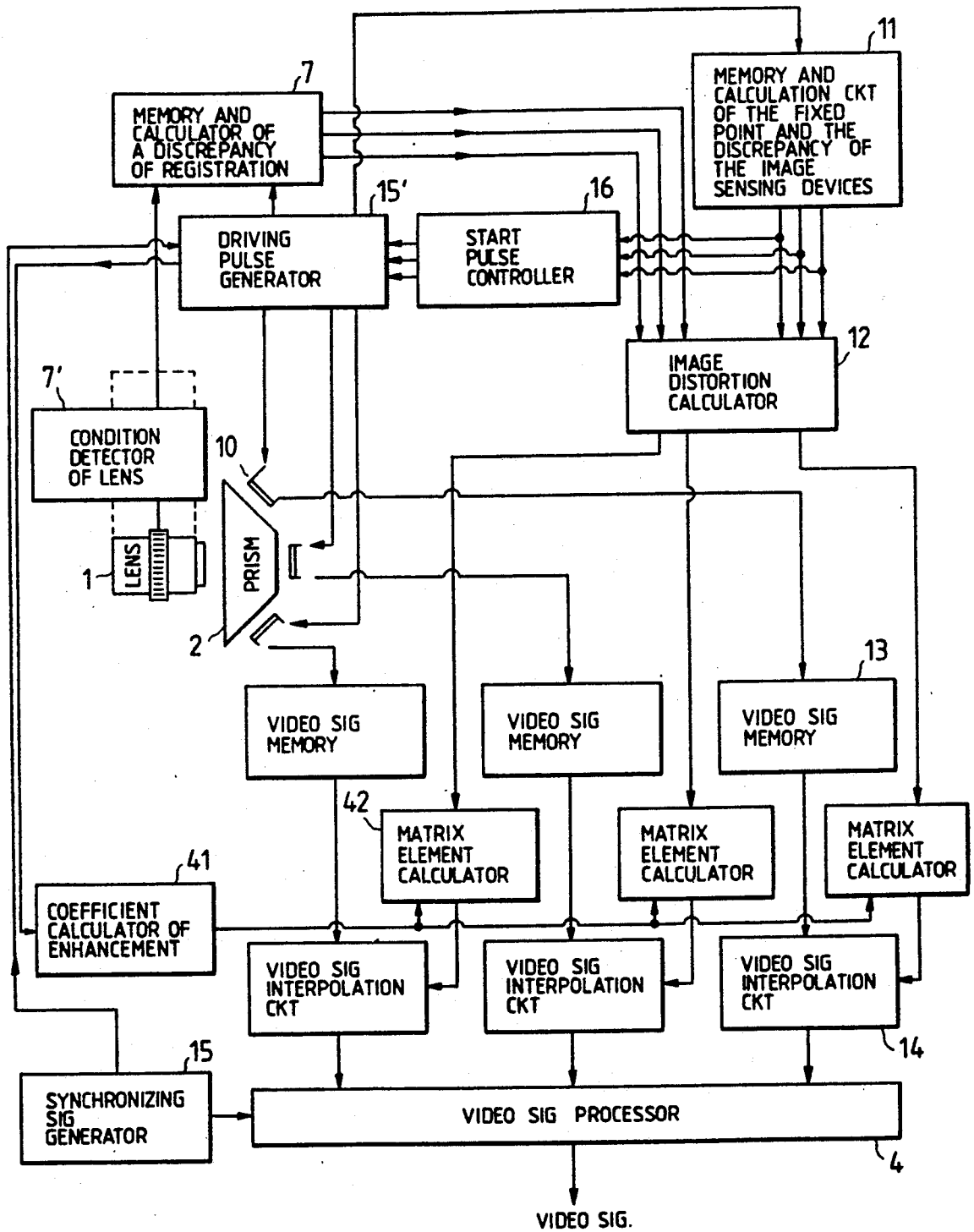
FIG. 8 is a diagram showing a second embodiment of the present invention.

FIG. 8 shows the second embodiment of the present invention. Generally speaking, the resolution of the optical lens is high at the center and lower toward the periphery. In the picture periphery, therefore, it is desirable to enhance the high-frequency components of the video signals to a higher level than is at the center. FIG. 8 shows a circuit, which is composed of an enhancement coefficient calculator 41 and a matrix calculator 42 in addition to the circuit components of FIG. 1, so that a variety of two-dimensional filtering operation (e.g., noise suppressing filtering operations), including the aforementioned enhancement, can be accomplished.

The discrepancy of the image due to the lens aberrations and the fixing discrepancy of the elements is determined similar to that of the circuit of FIG. 1 by the memory/calculator 7, the memory/calculator 11, and the image distortion calculator 12. In the enhancement coefficient calculator 41, on the other hand, the enhancement or other coefficients for each picture element is determined, and the coefficient of the matrix (which may be generally 2×2 or more)like that of the ordinary two-dimensional filter (as disclosed on pp 113 of "Digital Signal Processing of Images" published by Nikkan Kogyo Shinbun), is accordingly determined. In the matrix element calculator 41, moreover, the matrix coefficients are corrected with the image distortion determined by the image distortion calculator 12. After this, the video signal interpolators 14 interpolate the picture element signals by using the coefficients of the matrix determined by themselves, while considering all the image distortions and the enhancement. The interpolated output signals of the video signal interpolators 14 are fed to a signal processor 4 to produce the video signals.

The matrix elements ordinarily used for the interpolations are fractions composed of simple integers so that they can be manipulated relatively easily. Unfortunately, the calculations such as the picture element interpolations and the enhancements following the image distortions require high accuracy. If calculating using simple integers are repeated, the rounding errors accumulate to deteriorate the image quality.

In the present circuit, the image distortions and the coefficients necessary to various two-dimensional filtering of the enhancers are rounded in advance. The calculations of the video signals requiring high accuracy are accomplished simultaneously. Thus, the rounding error in the video signal calculations is reduced to a low level.

In the present circuit, as in the circuit of FIG. 1, the image distortions can be corrected so that high accuracy is not required for the fixing accuracy of the image pickup elements and the characteristics of the lens used.

Figure 9:
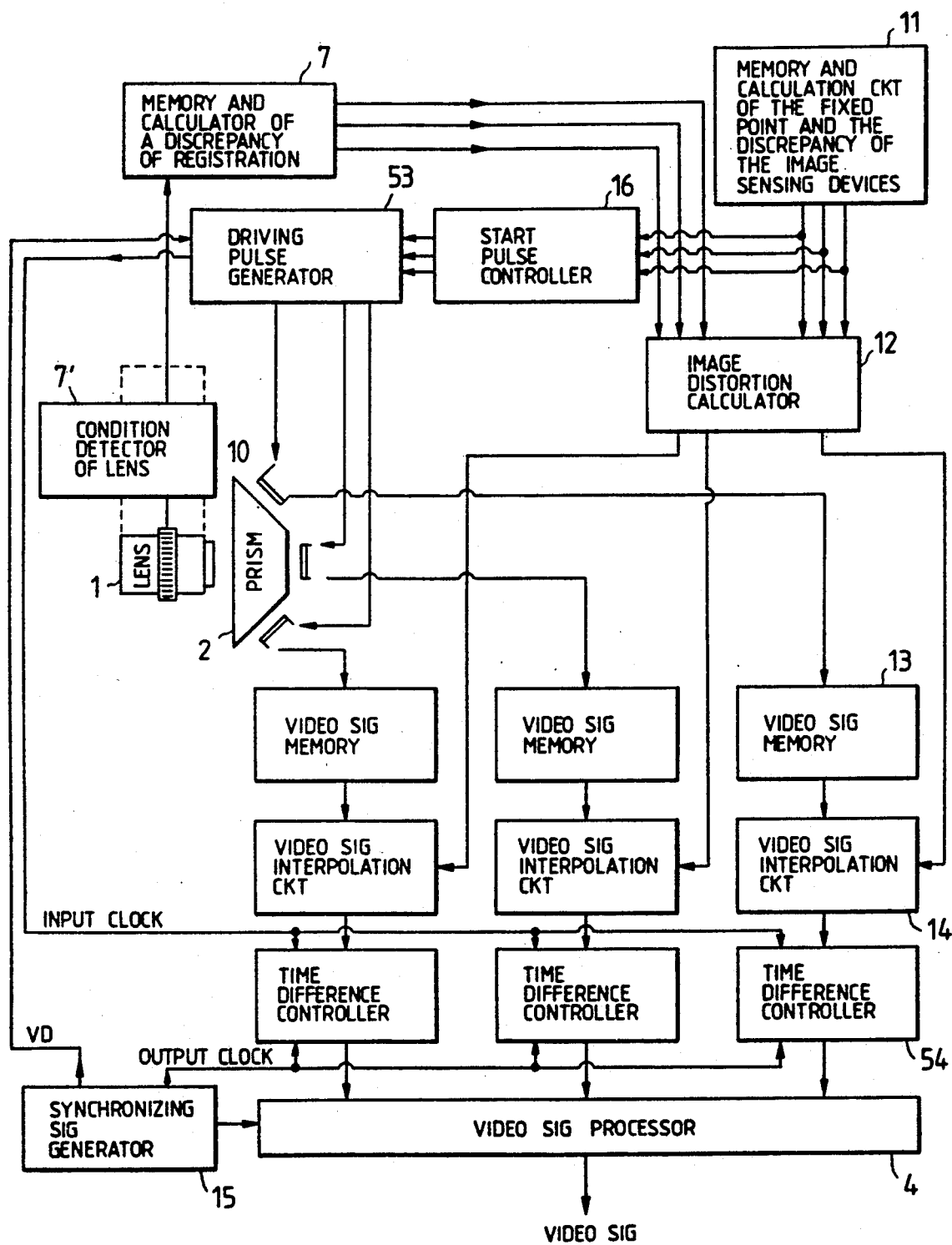
Figure 10A:
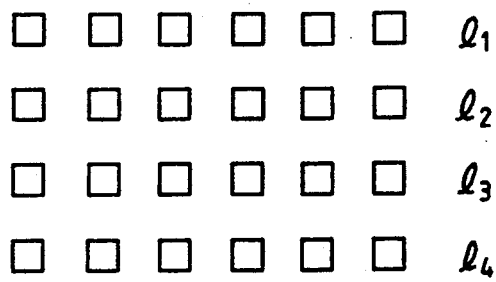
Figure 10B:
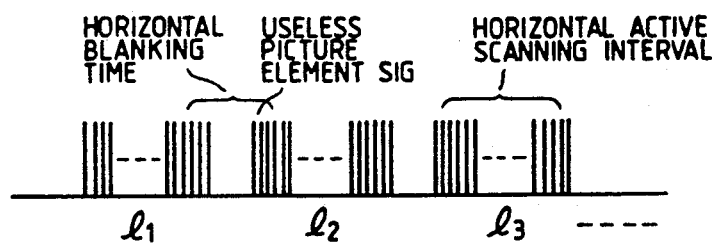
Figure 10C:
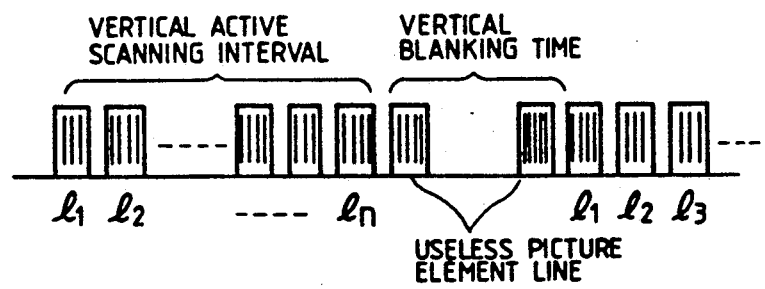

FIG. 9 shows the third embodiment of the present invention. The solid state image pickup element generally has a structure in which the picture elements are arrayed in a two-dimensional form, as shown in FIG. 10A. As shown in FIGS. 10B and 10C, the scanning operations are sequentially accomplished with driving pulses having a constant horizontal clock frequency and horizontal synchronizing frequency. The useless picture element signals unnecessary for the output shown in FIG. 2 can be eliminated for the periods corresponding to the horizontal blanking time and the vertical blanking time. If, however, the fixing accuracy is low, the number of the useless picture elements is increased so that the useless picture element signals cannot be eliminated using the horizontal blanking time and the vertical blanking time.

So that the circuit of FIG. 9 may eliminate the useless picture element signals, the solid state image pickup elements are driven with a horizontal clock frequency and a horizontal synchronizing frequency, which are different from the horizontal clock frequency and the horizontal synchronizing frequency determined from the effective picture element number necessary for the TV system used for the output. However, the field frequency is equalized to that of the TV system used for the output.

On the basis of the vertical synchronizing pulses (for determining the field frequency) output from the synchronizing signal generator 15, the driving pulses have a horizontal clock frequency and a horizontal synchronizing frequency higher than those determined by the TV system are generated by a driving pulse generator 53. These driving pulses are used to drive the circuits such as the solid state image pickup elements and the image distortion calculator 12 up to the video signal interpolators 14. After this, the output signals of the video signal interpolators 14 are transformed by the signal processor into video signals after they have passed through a time difference controller 54 for equalization to the frequency of the output signals.

Thus, the present circuit can eliminate the useless picture element signals generated and corrects the position distortion of the image, even when the fixing accuracy of the solid state image pickup element is so poor that the useless picture element signals cannot be eliminated by the drive of the ordinary clock frequency.

Incidentally, the invention described with reference to FIG. 9 relates to the case when the signals are sequentially read out from the solid state image pickup elements for each horizontal line. However, several lines of the solid state image pickup elements can be simultaneously read out so that the may be driven with the driving pulses having a horizontal clock frequency and a horizontal synchronizing frequency lower than those determined by the TV system.

Figure 11A:
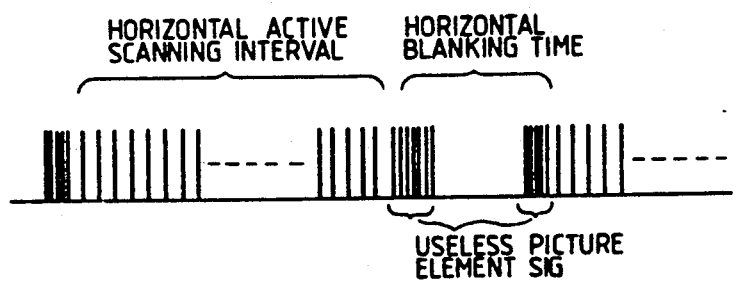
FIGS. 9 to 11 are diagrams showing and explaining a third embodiment of the present invention.
Figure 11B:
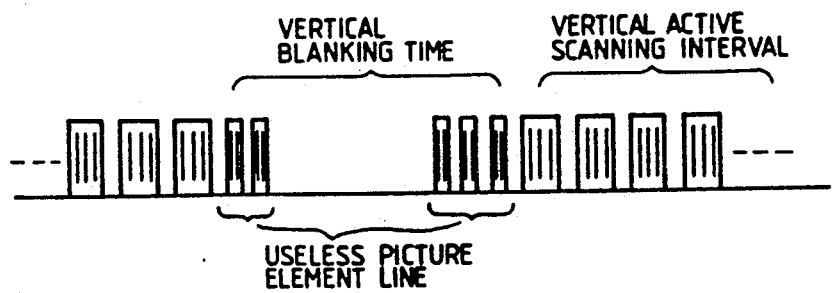

In order to eliminate the useless picture element signals, moreover, unlike the operations of FIG. 10 in which the drive is always accomplished with the constant clock frequency, the useless picture element signals, which could not be eliminated for the period corresponding to the horizontal blanking time and the vertical blanking time of FIGS. 11A and 11B, may be partially read out and eliminated at high speed.

Figure 12:
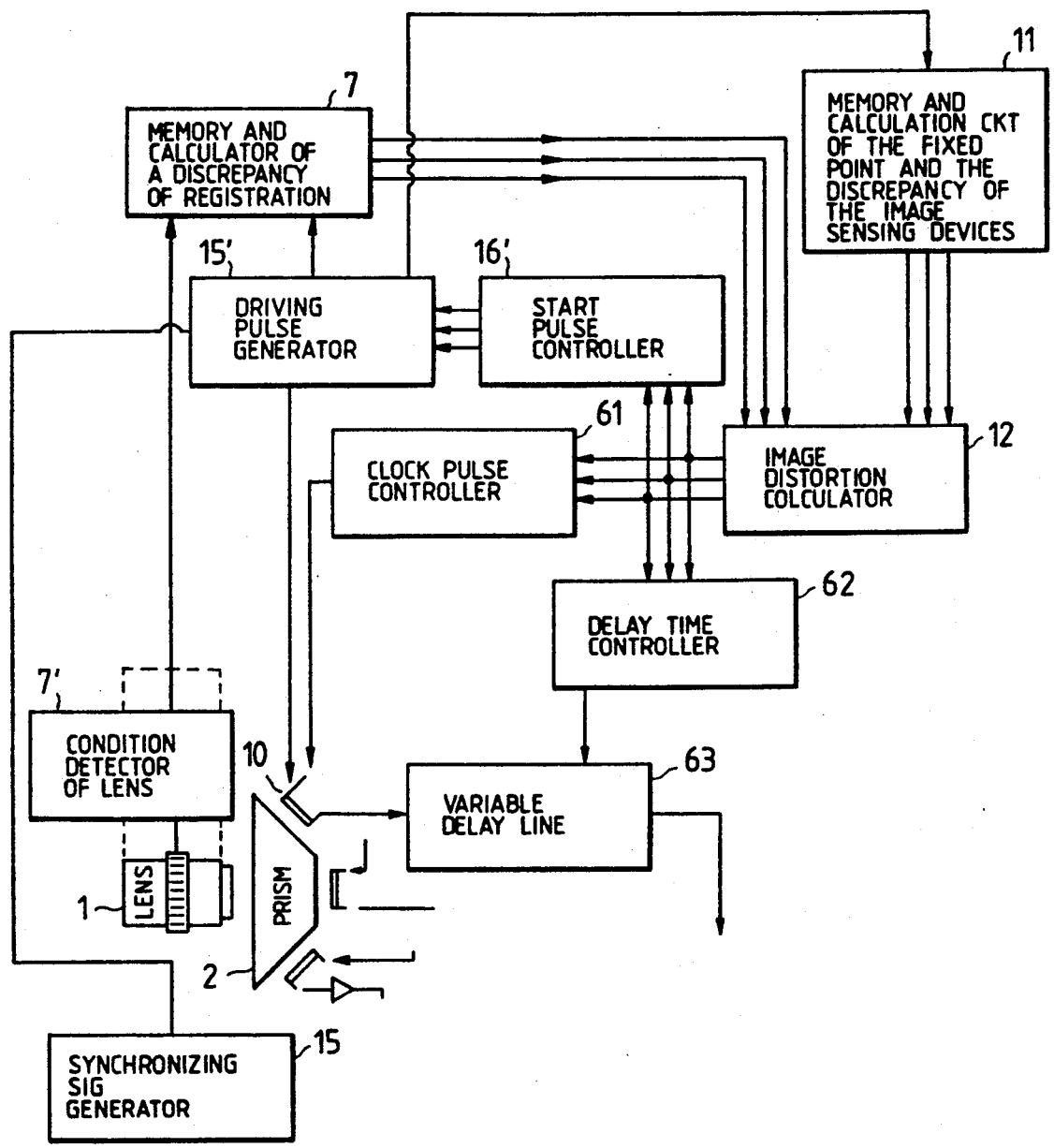
FIG. 12 is a diagram showing a fourth embodiment of the present invention.

FIG. 12 shows a fourth embodiment of the present invention, in which the registration discrepancy in the horizontal direction is corrected by controlling the output timing of the signals coming from the image pickup elements.

Specifically, when the image position of the R signal is distorted to the left from the image position of the G signal, the R signal is read out with such a slight delay that it may be read out simultaneously with that of the G signal. If the distortion takes place in the reverse direction, i.e., to the right, the R signal is read out slightly earlier so that it can be output simultaneously with the G signal. Thus, the R, G, and B signal of the same image position can be read out at a common timing to correct the registration discrepancy in the horizontal direction.

FIG. 12 shows an example of the circuit for realizing the above-specified operations, in which only a portion relating to one image pickup element is taken out for simplicity. Like the circuit of FIG. 1, the registration discrepancy calculated by the image distortion calculator 12 is input to a clock controller 61. Moreover, the frequency of the clock signal is controller directly in conformity to the registration discrepancy to adjust the timing, at which the signals are to be read out from the image pickup element, so as to accomplish the interpolations. On the other hand, a delay time controller 62 is a circuit for controlling a variable delay line 63. The delay time controller 62 controls the delay of the variable delay line 63 in conformity with the registration discrepancy, which is calculated by image distortion calculator 12, to adjust the output timing of the signals indirectly for interpolations. Incidentally, the start phase of the driving pulses of the solid state image pickup element is adjusted through a start pulse controller 16' in accordance with the changes in the frequency of the clock signal.

Thus, in the present embodiment, the registration discrepancy in the horizontal direction can be easily interpolated without interpolations of the output signals.

Although the invention described above relates to the case when two indirect methods are used together, it is apparent that only one of them may be used for the corrections.

Figure 13:
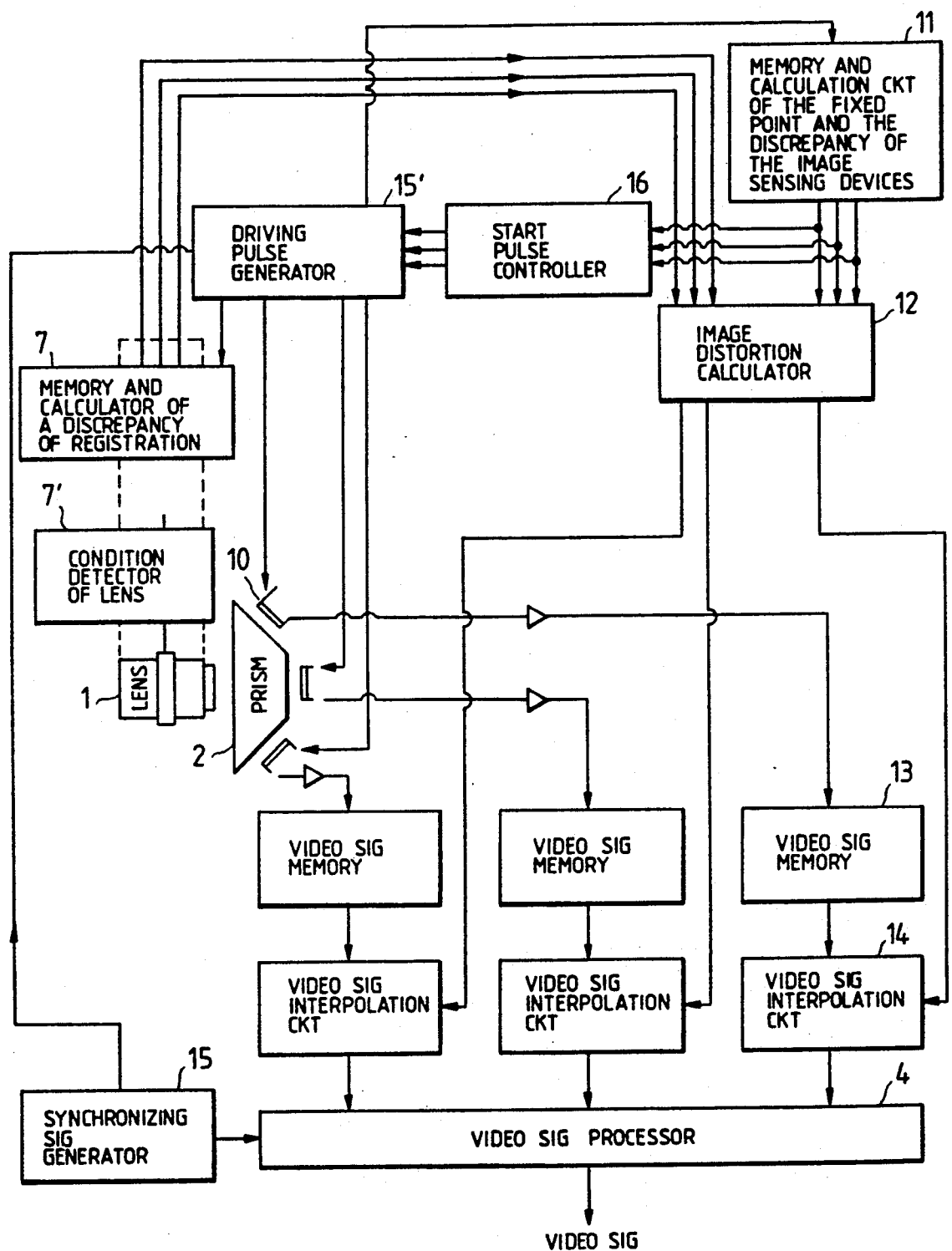
FIGS. 13 to 15 are diagrams showing a fifth embodiment of the present invention.

The fifth embodiment of the present invention is shown in FIG. 13. This embodiment is different from the first embodiment in that not only the lens condition detector 7' of FIG. 1 but also the memory/calculator 7 of the registration discrepancy is built into the lens itself.

Here in the photography of an ordinary TV program, the taking lenses have to be exchanged so as to change the field angle. For example, a telephotolens having a long focal length is used for outdoor photography whereas a wide angle lens having a short focal length is used for studio photography. In the camera using the image pickup tube of the prior art shown in FIG. 7, however, such troublesome operations have to be accomplished for each lens exchange to rewrite the content of the aberration correction data stored in the camera body or to exchange a chip of read only memory (i.e., ROM) incorporated.

In the camera having the circuit structure of FIG. 13, on the contrary, the registration discrepancy memory/calculator 7 is replaced simultaneously with the lens exchange. As a result, the aberration correcting data stored in the memory/calculator 7 are also automatically exchanged to eliminate the above-specified troublesome operations.

Figure 14:
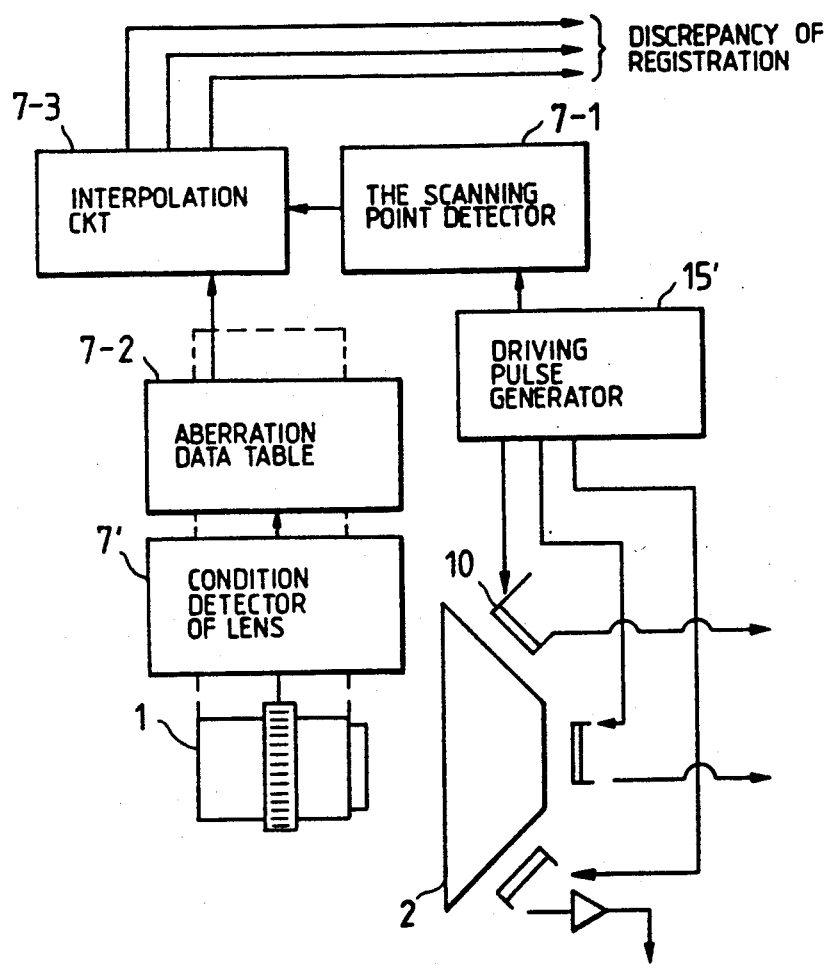
Figure 15:
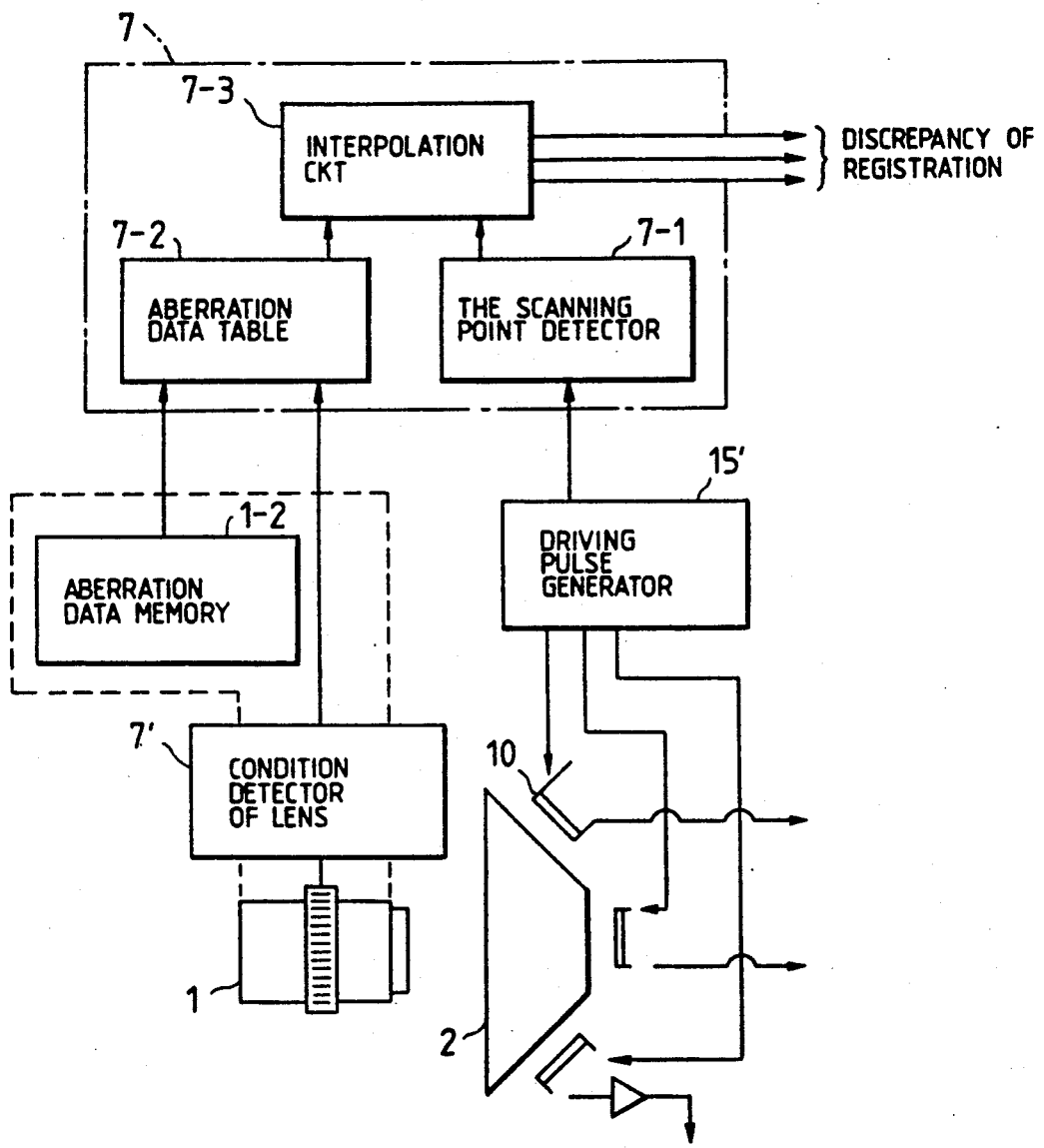

In the present embodiment, moreover, it is important to store the aberration correcting data in each lens, but there is no necessity for storing all the contents of the memory/calculator 7 in the lens. For example, as shown in FIG. 14 (in which only the optical system and the portion of the memory/calculator 7 are shown for simplicity), the lens may store only the aberration data table 7-2 or the circuit of the memory/calculator 7 for storing the lens characteristics. Alternatively, as shown in FIG. 15, the lens is additionally equipped with an aberration data memory 1-2 which is composed of a ROM or the like to store the lens characteristics. When the lens is exchanged, the lens characteristics stored are read in the aberration data table 7-2 of the memory/calculator 7 in the camera body so that the ordinary corrections may be subsequently accomplished by using the data of the aberration data table 7-2 stored in the lens body. It is quite natural that the image position data of the scanning point detector 7-1 may be sent to the aberration data memory 1-2 to calculate the registration discrepancy directly by using the data in the aberration data memory 1-2.

Thus, in the circuit of the present embodiment, the aberration correction data is automatically exchanged simultaneously with the lens exchange to eliminate troublesome operations of the prior art, which have to be accomplished for each lens exchange.

The description made above is directed to the case in which all the R, G and B signal are interpolated. By taking the image position of one signal (e.g., the G signal) as a reference, the registration signal of the other element is interpolated to adjust the relative position to the position of the reference image. Moreover, this reference signal (e.g., the G signal) may be omitted so long as its image is not highly distorted.

Moreover, either the horizontal or vertical direction may be interpolated although the effects are weakened when only one direction is interpolated.

Although the chromatic aberration of the lens are taken up as the characteristics of the optical system, the registration discrepancy due to the prism 2 for separating the incident ray into the primaries may also be interpolated.

Although the invention described is a triple-disc type, it can also be applied to the single-disc type or a dual-disc type for separations of primaries. The invention can also be used in a monochromatic camera.

Moreover, the image pickup apparatus using the image pickup tube may use the method of the present invention, i.e., the method of correcting the image distortion by calculating the image signals read out. Especially in the image pickup tube camera for the digital signal processing, it is easy to realize the registration corrections by a two-dimensional digital filter. Although the fifth embodiment has ben described in the case of using the solid state image pickup elements, the present invention can be applied as it is to a camera using the image pickup tube.

On the other hand, the invention thus far described is directed to the case in which the data relating to the registration discrepancy is measured and stored so that the discrepancy may be calculated from the stored data. It is apparent to add a registration discrepancy detector for detecting the discrepancy directly from the video signals output from the image pickup elements so that the interpolations may be accomplished by using the registration discrepancy detected.

As has been described above, according to the present invention, the video signals of the necessary area can be obtained at all time from the solid state image pickup elements even if the fixing positions of the solid state image pickup elements are distorted. Even if, moreover, the output signals contain the registration discrepancy by the fixing discrepancy of the image pickup elements or the chromatic aberrations of the lens, the video signals necessary for the output having no position distortion are determined by interpolations form the output signals of the solid state image pickup elements. A high accuracy is not required of the fixed point of the image pickup elements and the characteristics of the lens used.

We claim:

1. An image pickup apparatus including an optical lens and an image pickup element comprised of individual picture elements for transforming an optical ray having passed through said optical lens into electrical signals, comprising:
    means for storing at least one information of a fixing discrepancy of said image pickup element and a chromatic aberration of said optical lens;
    means for calculating a registration discrepancy with the fixing discrepancy and the chromatic aberration; and
    means for anticipating and interpolating video signals obtained from the individual picture elements to generate an output comprising means for guiding the video signals through a two-dimension filter determined by the registration discrepancy calculated.

2. The image pickup apparatus according to claim 1 wherein a field frequency for reading out signals from said image pickup element is equal to that of a TV system used for the output, and wherein a scanning rate in a horizontal direction is different from a horizontal scanning rate which is determined from an effective photodetect area necessary for the TV system used for the output.

3. The image pickup apparatus according to claim 1, further comprising:
    a driving pulse generator for controlling an oscillatory frequency; and
    a start pulse generator for controlling a drive starting timing of said image pickup apparatus,
    whereby at least one of the oscillatory frequency of said driving pulse generator and said drive starting timing is in accordance with the discrepancy of the image of the signals obtained from said image pickup element.

4. The image pickup apparatus according to claim 1, further comprising:
    a video signal delay circuit for controlling a delay time to a predetermined value, whereby the delay time of said video signal delay circuit is controlled to the predetermined value in accordance with the discrepancy of the image of the signals obtained from said image pickup element.

5. An image pickup apparatus including:
    an optical lens; and
    a solid state image pickup element comprised of a plurality of photoelectric transforming elements for transforming an optical ray having passed through said optical lens into electric signals and having a structure of picture elements arrayed two-dimensionally,
    having an improvement in that a number of picture elements contained in the photodetect area of said solid state image pickup element are:
    Mv+Nv or more in the vertical direction; and
    Mh+Nh or more in the horizontal direction,
    wherein a picture element number converted value of a fixing discrepancy, when said solid state image pickup element is to be fixed at the back of said optical lens, is designated Mv in the vertical direction and Mh in the horizontal direction and the number of effective picture elements necessary for the output are designated Nv in the vertical direction and Nh in the horizontal direction, whereby image signals of the necessary area are obtained from the image pickup element even when registration discrepancy in the fixed point of the image pickup element exists.

6. An image pickup apparatus including an optical lens and an image pickup element for transforming an optical ray having passed through said optical lens into electric signals, wherein at least a portion of the signals stored in an area, not including the effective photodetect area for obtaining the signal to be used for the output within the photodetect area of said image pickup element, is read out at a higher rate than that for reading out the signals in said effective photodetect area.

7. An image pickup apparatus comprising:
    at least one of a memory for storing fixing discrepancy data of an image pickup element, and a memory for storing lens characteristics such as chromatic aberrations of said optical lens;
    a calculator for calculating discrepancies of positions of each point in an effective photodetect area represented by a point being noted and a point on a fixed image pickup element from at least one of the fixed discrepancy and lens aberration data in said memory, positional data in the picture of the point being noted and condition data indicating the operating conditions of said optical lens;
    a video signal memory for storing at least a portion of signals obtained from said image pickup element; and
    an interpolator for anticipating and interpolating a video level of each point in said effective photodetect area necessary for a video output by reading out a portion of the video signals according to said calculated discrepancies from the video signals stored in said video signal memory and by calculating the video signals read out in a predetermined manner.

8. The image pickup apparatus according to claim 7, wherein an enhancement for stressing a high-frequency component of the image is accomplished simultaneously with the anticipation and interpolation of the video level from the discrepancies between each point in the effective photodetect area necessary for said video output and each point in the photodetect area of said fixed image pickup element.

9. The image pickup apparatus according to claim 7 having a means for shifting a timing for starting at least one of a vertical and horizontal reading-outs of the signal from said image pickup element is shifted to an early or late side in case an optic axis of said optical lens extends through a center of the effective photodetect area of said image pickup element, so that a positional correction for fixing the discrepancy of said image pickup element may be smaller than in a case of a state timing.

10. The image pickup apparatus according to claim 7, wherein at least two image pickup elements are used, further comprising:
   a calculator for calculating the discrepancy of an image of said image pickup elements providing the fixing reference; and
   a video interpolator for anticipating and interpolating the video level of each point in the effective photodetect area necessary for said output from said calculated discrepancy.

11. An image pickup apparatus capable of correcting registration discrepancy due to fixed point discrepancies of an image pickup element and chromatic aberrations of a camera lens comprising:
   first storing and calculating means for storing and calculating data related to the fixed point discrepancy of the image pickup elements;
   second storing and calculating means for storing and calculating data relating to the chromatic aberrations of the camera lens;
   distortion calculating means for calculating a final distortion of an image wherein the final distortion of the image is calculated based on input from the first storing and calculating means and the second storing and calculating means;
   image sensing means for sensing images and converting optic signals to electrical signals;
   third storing means for storing said electrical signals;
   interpolating means for interpolating data input from said third storage means and said distortion calculating means wherein a two-dimensional filter equation is utilized to produce an output; and
   video signal processing means for processing the output of said interpolating means to produce video signals.

12. The image pickup apparatus according to claim 11 further comprising:
   enhancement coefficient calculating means for enhancing high frequency components of the video signals; and
   matrix calculating means for correcting elements of a matrix based upon the final distortion calculated in the distortion calculating means whereby, in a lens that has high resolution at the center of the lens, the resolution at the periphery of the lens can be improved.

13. The image pickup apparatus according to claim 11 further comprising time difference control means for equalizing frequencies of signals which are to be transformed into video signals by the video signal processing means whereby unequal frequencies can be utilized during signal processing in order to eliminate useless picture elements.

14. The image pickup apparatus according to claim 11 further comprising delay timing means for adjusting timings of output signals which are to be interpolated.

15. The image pickup apparatus according to claim 11 wherein a lens system comprises the camera lens, the second storing and calculating means, and a lens condition detector.

16. An image pickup apparatus capable of correcting registration discrepancy due to fixed point discrepancies of an image pickup element and chromatic aberrations of the camera lens comprising:
   calculating means for calculating the registration discrepancy;
   image sensing means for sensing images projected by said camera lens; and
   video signal processing means for processing data input from said image sensing means and said calculating means wherein the data is interpolated utilizing a two-dimensional filter equation and output as a video signal.

17. A method for correcting registration discrepancy due to fixed point discrepancies of an image pickup element and chromatic aberrations of a camera lens used in an image pickup apparatus comprising the steps of:
   processing and storing data related to the fixed point discrepancy of the image pickup element and the chromatic aberration of the lens in a first storing device, wherein the data stored represents a fixed distortion image;
   sensing and storing images projecting by the camera lens in a second storing device;
   interpolating the data stored in the first and second storing devices to produce an output corrected for the registration discrepancy; and,
   processing the output to produce a video signal.

* * * * *